United States Patent Office 3,396,130
Patented Aug. 6, 1968

3,396,130
ORGANIC TRIPHOSPHITES AND SYNTHETIC RESIN COMPOSITIONS CONTAINING THE SAME
William E. Leistner, Brooklyn, and Arthur C. Hecker, Forest Hills, N.Y., assignors to Argus Chemical Corporation, Brooklyn, N.Y., a corporation of New York
No Drawing. Filed Oct. 2, 1962, Ser. No. 227,705
10 Claims. (Cl. 260—23)

This invention relates to new organic phosphites and to synthetic resin and particularly olefin polymer and polyvinyl chloride resin compositions containing the same, and having, as a result, an improved resistance to deterioration, evidenced particularly by improved long term stability, when heated at elevated temperatures.

Many organic phosphites have been proposed as stabilizers for polyvinyl chloride resins, and are employed either alone or in conjunction with other stabilizing compounds, such as polyvalent metal salts of fatty acids and alkyl phenols. Such phosphite stabilizers normally contain an alkyl or aryl radical in sufficient number to satisfy the three valences of the phosphite, and typical phosphites are described in the patent literature, for example, United States Patents Nos. 2,564,646, 2,716,092, and 2,997,454.

Phosphites are also employed in conjunction with plasticizers, which are usually esters of phosphoric acid or of a polyhydric alcohol and a long chain fatty acid, which desirably in addition contains epoxy groups, such as epoxidized soy bean oil. However, many phosphites, and particularly those with aryl or alkaryl or aralkyl groups, are not very compatible with polyvinyl chloride resins compounded with fatty acid ester plasticizers, and it is difficult to formulate resin compositions containing both components in particularly desired proportions.

In accordance with the invention, organic phosphites are provided containing both a phosphite radical, important for the type of stabilization imparted by a phosphite, and an alkylene glycol monocarboxylic acid ester radical which may include one or more epoxy groups in the acid portion, important to stabilization and to compatibility with polyol acid ester plasticizers. These compounds are liquids and are easily incorporated in stabilizer compositions for addition to the resin, as well as being completely compatible with polyolefins and polyvinyl chloride resins in the proportions required for stabilization.

The monomeric phosphites of the invention can be characterized by the following formula:

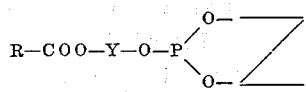

R is a saturated or unsaturated straight or branched chain organic radical having from one to twenty-three carbon atoms. Y is a saturated or unsaturated straight or branched alkylene radical having from two to twenty carbon atoms. Z is one or a plurality of radicals taken singly or together in sufficient number to satisfy the valences of the two phosphite oxygen atoms. Z can be hydrogen or an organic radical or radicals, which can be or include alkylene ester radicals of the type

R—COO—Y—

RCOO is derived from a monocarboxylic acid, and it should not contain nitrogen atoms in the molecule. Aliphatic, aromatic, alicyclic and oxygen-containing heterocyclic monocarboxylic RCOO groups are operative, as a class. The groups may be substituted, if desired, with groups such as halogen, sulphur, and hydroxyl. The oxygen-containing heterocyclic acid groups include oxygen and carbon in the ring structure, of which alkyl-substituted furoyl groups are exemplary. As exemplary of the acid groups RCOO, there can be mentioned the following: acetyl, caproyl, 2-ethyl hexanoyl, lauroyl, chlorocaproyl, hydroxy caproyl, stearoyl, hydroxy stearoyl, palmitoyl, oleoyl, myristoyl, dodecyl thioether propionyl $$C_{12}H_{25}—S—(CH_2)_2—COO$$

hexahydrobenzoyl, benzoyl, phenylacetyl, isobutyl, benzoyl, ethyl benzoyl, isopropyl benzoyl, ricinoleoyl, p-t-butylbenzoyl, n-hexyl benzoyl, salicyl, naphthoyl, 1-naphthalene acetyl, orthobenzoyl benzoyl, naphthenoyl derived from petroleum, abietyl, dihydroabietyl, and methyl furoyl.

Also effective are RCOO groups containing at least one epoxy group. The remainder of the group can be aliphatic or cycloaliphatic in character, but aromatic and heterocyclic groups can also be present. Typical epoxy-containing RCOO groups are such as epoxy stearoyl and epoxy oleoyl, diepoxy stearoyl and epoxy hexahydrobenzoyl.

Y represents a bivalent group derived from a glycol. Typical Y groups include ethylene; 1,3-propylene; 1,2-propylene; 1,4-butylene; 1,5-pentylene; 2,4-dimethylpentylene-1,3; 2,3-butylene; 1,3-butylene; 2-ethyl-hexylene-1,3; 1,8-octylene; 1,10-decylene; 1,12-dodecylene; 2,4-hexylene; 2,2,4-trimethyl pentylene-1,3; and 9-octadecene-1,12-diyl.

The Z radicals in the above formula, in a monomeric phosphite, in general, have from about one to about twenty-four carbon atoms. Z can, for example, be two univalent radicals, such as one or two hydrogen atoms, one or two aliphatic hydrocarbon radicals, such as methyl, ethyl, propyl, isopropyl, butyl, isobutyl, secondary butyl, tertiary butyl, amyl, isoamyl, hexyl, isohexyl secondary hexyl, heptyl, octyl, isoctyl, 2-ethylhexyl, nonyl, decyl, undecyl, dodecyl, tetradecyl, tridecyl, octadecyl, behenyl, and 9-octadecenyl, one or two monovalent aryl radicals, such as phenyl, benzyl, phenethyl, xylyl, tolyl, and naphthyl, one or two univalent cycloaliphatic radicals, such as cyclohexyl, cyclopentyl, cycloheptyl, bornyl, abiethyl, and cyclohexene-3-carbonyl and one or two heterocyclic radicals, such as thienyl, tetrahydrofurfuryl and furyl.

Z can also be a single radical forming a heterocyclic ring with the

group, such as a bivalent aliphatic hydrocarbon radical, for example, ethylene, 1,2-propylene, 1,3-propylene, 1,2-butylene, 1,3-butylene, 1,4-butylene, neopentylene, and 1,3-pentylene or such a radical as pentaerythrytene; a bivalent arylene or mixed alkylene arylene radical, such as 2-phenethylene, 1,4-phenylene, biphenylene, m-xylylene, o-xylylene and p-xylylene, a bivalent cycloalkylene radical, such as cyclohexylene and cyclopentylene; and a bivalent heterocyclic radical such as tetrahydrofuran-2,5 dicarbinyl.

Z can of course include ester groups of the type RCOOY—.

The following compounds are illustrative of glycol ester phosphite compounds coming within the invention:

1. 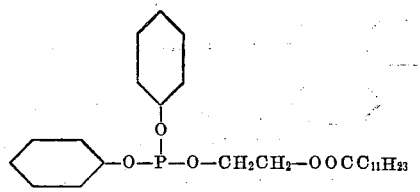

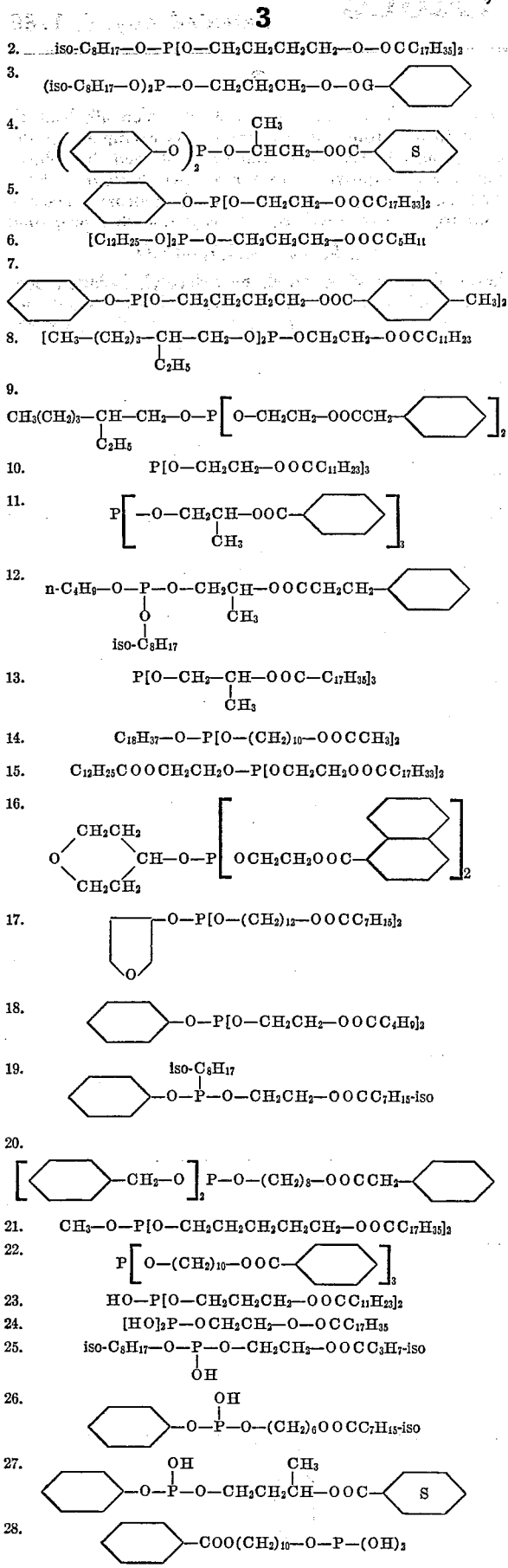

a monoester of an aliphatic glycol. In the course of the reaction the alkyl or aryl radicals of the phosphite are replaced by glycol ester radicals. In the case of mixed alkylaryl phosphites, the aryl radicals are replaced first.

The extent of substitution of groups by glycol monoester groups depends upon the proportions of the ingredients. Glycol monoester phosphites are formed even if less than one molar equivalent of glycol monoester is used. If one mole of glycol monoester is employed per mole of the phosphite, one glycol ester group is introduced per phosphite group. If two moles of the glycol ester are employed, a bisglycol ester phosphite is obtained, and if three moles are employed, all of the alkyl or aryl radicals of the phosphite can be replaced by glycol ester radicals.

The reaction will proceed in the absence of a catalyst, but a faster and more complete reaction is obtained if a catalyst is used. The catalyst employed ordinarily is an alkali or alkaline earth metal, which can be added in the form of the metal or in the form of an alkaline salt, such as an alkaline oxide, or as the alcoholate. Generally, any compound of the alkali or alkaline earth metals having a pH in a 1% aqueous solution of at least 10 will be satisfactory. Sodium metal is quite satisfactory, and so are sodium hydroxide, potassium hydroxide, the oxides and hydroxides of calcium, strontium and barium, and the alcoholates, usually of methyl, ethyl or isopropyl alcohol or phenolates of all of these metals. Other suitable catalysts include trisodium phosphate, potassium carbonate, sodium cyanide, potassium sulfide, sodamide, lithium hydride, butyl lithium, sodium borohydride and sodium naphthenate. Only a very small amount of the catalyst need be employed, for example, as little as from 0.01 to 2.0 percent by weight of the phosphite.

It is usually desirable that the reactants be anhydrous, although very small amounts of water can be tolerated in the system. If sodium or potassium or the oxides of calcium, barium and strontium are added, they will react with the water or alcohol present to form the corresponding hydroxide or alcoholate, and the latter compound will then serve as a catalyst. A volatile alcohol, such as ethanol, methanol or isopropyl alcohol, can be added as a solvent, if the reactants are incompatible.

The reactants, i.e. glycol monoester, phosphite, anhydrous alcohol, if desired, and catalyst are mixed, and the reaction mixture then heated at an elevated temperature, usually under reflux. A temperature within the range from about 40 to about 150° C. can be employed. The alcohol or phenol corresponding to the alkyl or aryl group of the phosphite being substituted is liberated in the course of the reaction. The reaction can be carried out for several hours' time, and the alcohol or phenol then distilled out, or, if desired, liberated alcohol or phenol may be continuously distilled off. Vacuum distillation can be used if the phenol or alcohol has a high boiling point.

Example I

In a three-necked round-bottomed 1 liter flask was placed 310 g. (1 mole) of triphenyl phosphite (9.7% phosphorus) and 238 g. (1.1 mole) of 2,2,4-trimethyl pentanediol monoisobutyrate. As a catalyst, 1.9 g. of 50% aqueous sodium hydroxide was added. The mixture was stirred and heated at 120-130° C. for three hours. At the completion of this time, the reaction mixture was vacuum stripped to remove phenol that had been liberated by the transesterification. 82 g. of phenol were recovered. The theoretical amount for substitution of 1 mole of the monoisobutyrate was 94 g., showing that the product was a mixture of triphenyl phosphite and diphenyl mono(2,2,4-trimethyl pentanediol monoisobutyrate)phosphite.

In order to complete the transesterification, the reaction mixture was heated again under vacuum, distilling out phenol as fast as it was formed, and heating continued to a pot temperature of 150° C., which was maintained until the temperature above the reaction mixture had dropped to below 85° C., showing that no more phenol was being distilled. This required an additional 2 hours. At the end of this time, the total phenol recovered was 112 g., showing that reaction to form the diphenyl mono(2,2,4-trimethyl pentanediol monoisobutyrate)phosphite was complete.

A polyvinyl chloride homopolymer formulation was prepared employing this phosphite and having the following composition.

Plastic composition: Parts by weight
    Dow 100-4 (homopolymer of polyvinyl chloride) _____ 100
    Barium octylphenolate _____ 1.0
    Cadmium 2-ethylhexoate _____ 1.5
    Diphenyl mono(2,2,4 - trimethyl pentanediol monoisobutyrate) phosphite _____ 50

The barium octylphenolate, cadmium 2-ethylhexoate and the phosphite were mixed together and then blended with the polyvinyl chloride. The mixture was heated on a 2-roll mill up to 250° F. and sheeted off. Samples were then heated in an oven at 350° F. for 3½ hours to test heat stability. The discoloration was noted at 15 to 30 minute intervals. The composition remained colorless for the first hour of heating, then developed a faint yellow coloration which gradually intensified up to 3 hours, after which it became orange, and at the end of 3½ hours had darkened to black. Thus, the phosphite of the invention gave excellent stabilization to this formulation. In addition, the resin formulation was plasticized by the phosphite, no supplemental plasticizer being required.

Example II

In a three-necked round-bottomed 1 liter flask was placed 155 g. (0.5 mole) of triphenyl phosphite and 324 g. (1.5 mole) of 2,2,4-trimethyl pentanediol monoisobutyrate, with 2.6 g. of aqueous sodium hydroxide solution as a catalyst. The mixture was stirred and heated at 120–130° C. for three hours, and vacuum then applied to strip the phenol. Heating was continued under vacuum until the pot temperature had reached 150° C., and the temperature above the reaction mixture had dropped to below 85° C. A total of 135 g. of phenol was recovered indicating complete transesterification to form tri(2,2,4-trimethyl pentanediol monoisobutyrate)phosphite.

This phosphite was employed to stabilize and plasticize a polyvinyl chloride homopolymer formulation having the following composition:

Plastic composition: Parts by weight
    Dow 100-4 (homopolymer of polyvinyl chloride) _____ 100
    Barium octylphenolate _____ 1.0
    Cadmium 2-ethylhexoate _____ 1.5
    Tri - 2,2,4 - trimethylpentanediol monoisobutyrate phosphite _____ 50

The barium octylphenolate, cadmium 2-ethylhexoate and the phosphite were mixed together and then blended with the polyvinyl chloride. The mixture was heated on a 2-roll mill up to 250° F. and sheeted off. Samples were then heated in an oven at 350° F. for 3½ hours to test heat stability. The discoloration was noted at 15 to 30 minute intervals. The composition remained colorless for the first hour of heating, then developed a faint yellow coloration which gradually intensified up to 3 hours, after which it became orange and at the end of 3½ hours had darkened to black. Thus, the phosphite of the invention gave excellent stabilization to this formulation. In addition, the resin formulation was plasticized by the phosphite, no supplemental plasticizer being required.

The term "polyvinyl chloride" as used herein is inclusive of any polymer formed at least in part of the recurring group

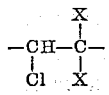

and having a chlorine content in excess of 40%. In this group, the X groups can each be either hydrogen or chlorine. In polyvinyl chloride homopolymers, each of the X groups is hydrogen. Thus, the term includes not only polyvinyl chloride homopolymers but also after-chlorinated polyvinyl chlorides as a class, for example, those disclosed in British Patent No. 893,288 and also copolymers of vinyl chloride in a major proportion and other copolymerizable monomers in a minor proportion, such as copolymers of vinyl chloride and vinyl acetate, copolymers or vinyl chloride with maleic or fumaric acids or esters, and copolymers of vinyl chloride with styrene. The invention also is applicable to mixtures of polyvinyl chloride in a major proportion with a minor proportion of other synthetic resins such as chlorinated polyethylene or a copolymer of acrylonitrile, butadiene and styrene.

The phosphites of the invention can be used for the stabilization of both rigid polyvinyl chloride resin compositions, that is, resin compositions which are formulated to withstand high processing temperatures, of the order of 375° F. and higher and plasticized polyvinyl chloride resin compositions of conventional formulation, where resistance to heat distortion is not a requisite. Conventional plasticizers well known to those skilled in the art can be employed such as, for example, dioctyl phthalate octyl diphenyl phosphate and epoxidized soybean oil.

Particularly useful plasticizers are the epoxy higher carboxylic esters having from 20 to 150 carbon atoms. Such esters will initially have had unsaturation in the alcohol or acid portion of the molecule or both, which is taken up by the formation of the epoxy group or groups.

Typical unsaturated acids are acrylic, oleic, linoleic, linolenic, erucic, ricinoleic, brassidic and tetrahydrophthalic acids, and these may be esterified with organic monohydric or polyhydric alcohols, the total number of carbon atoms of the acid and the alcohol being within the range stated.

Typical monohydric alcohols include butyl alcohol, 2-ethyl hexyl alcohol, lauryl alcohol, isooctyl alcohol, stearyl alcohol, and oleyl alcohol. The octyl alcohols are preferred.

Typical polyhydric alcohols include pentaerythritol, glycerol, ethylene glycol, 1,2-propylene glycol, 1,4-butylene glycol, neopentyl glycol, ricinoleyl alcohol, erythritol, mannitol and sorbitol. Glycerine is preferred.

These alcohols may be fully or partially esterified with the epoxidized acid. Also useful are the epoxidized mixtures of higher fatty acid esters found in naturally-occurring oils such as epoxidized soybean oil, epoxidized olive oil, epoxidized cottonseed oil, epoxidized tall oil fatty acid esters, epoxidized coconut oil and epoxidized tallow. Of these, epoxidized soybean oil is preferred.

The alcohol can contain the epoxy group and have a long or short chain, and the acid can have a short or long chain, such as epoxystearyl acetate, epoxystearyl stearate, glycidyl stearate, and polymerized glycidyl methacrylate.

The organic phosphite compounds of the invention can, if desired, be employed in conjunction with other stabilizers for polyvinyl chloride resins, although, in most cases, the stabilization imparted by the organic phosphite compound will be sufficient. In some cases, however, for particular end uses, special stabilization effects may be desired.

As supplemental stabilizers, there can be employed metal salt stabilizers of the type described in the Leistner et al. Patents Nos. 2,564,646 and 2,716,092 and other patents in this field. The metal salt stabilizer is a salt of a polyvalent metal and an organic acid having from six to twenty carbon atoms. The acid should be monocarboxylic, and it should not contain nitrogen atoms in the molecule. Aliphatic, aromatic, alicyclic and oxygen-containing heterocyclic monocarboxylic acids are operative, as a class.

The acids may be substituted, if desired, with groups such as halogen, sulphur, and hydroxyl. The oxygen-containing heterocyclic acids include oxygen and carbon in the ring structure, of which alkyl-substituted furoic acids are exemplary. As exemplary of the acids there can be mentioned the following: caproic acid, capric acid, 2-ethyl hexoic acid, lauric acid, chlorocaproic acid, hydroxy capric acid, stearic acid, hydroxy stearic acid, palmitic acid, oleic acid, myristic acid, dodecyl thioether propionic acid $C_{12}H_{25}$—S—$(CH_2)$—COOH, hexahydrobenzoic acid, benzoic acid, phenylacetic acid, isobutyl benzoic acid, monoethyl ester of phthalic acid, ethyl benzoic acid, isopropyl benzoic acid, ricinoleic acid, p-t-butylbenzoic acid, n-hexyl benzoic acid, salicyclic acid, naphthoic acid, 1-naphthalene acetic acid, orthobenzoyl benzoic acid, naphthenic acids derived from petroleum, abietic acid, dihydroabietic acid, and methyl furoic acid. These are used in the form of their metal salts, particularly the alkaline earth metal salts, such as magnesium, barium, strontium and calcium, and the zinc, cadmium, lead and tin salts. Where these salts are not known, they are made by the usual types of reaction, such as by mixing the acid, acid chloride or anhydride with the corresponding oxide or hydroxide of the metal in a liquid solvent, and heating, if necessary, until salt formation is complete. The barium, cadmium and zinc compounds are preferred.

Also effective supplementary stabilizers are organic compounds containing at least one epoxy group. These compounds can be used in amounts from 0 to 100 parts by weight per 100 parts of resin, depending upon the effect desired, since many epoxy compounds are, as indicated above, also plasticizers for polyvinyl chloride resins.

Any epoxy compound of sufficiently low volatility can be used. The compounds can be aliphatic or cycloaliphatic in character, but aromatic and heterocyclic groups can also be present. The compounds have from 8 to 150 carbon atoms. Epoxy compounds having less than about 8 carbons are generally too volatile. The longer chain aliphatic compounds of 20 carbon atoms and more are also plasticizers. Typical epoxy compounds that are not plasticizers are epoxy carboxylic acids such as epoxy stearic acid, glycidyl ethers of polyhydric alcohols and phenols, such as triglycidyl glycerine, diglycidyl ether of diethylene glycol, glycidyl epoxy stearyl ether, 1,4-bis(2,3-epoxy-propoxy) benzene, 4,4'-bis(2,3-epoxy-propoxy)diphenyl ether, 1,8-bis(2,3-epoxypropoxy) octane, 1,4-bis-(2,3-epoxypropoxy) cyclohexane, and 1,3-bis(4,5-epoxypentoxy) 5-chlorobenzene, the epoxy polyethers of polyhydric phenols, obtained by reacting a polyhydric phenol with a halogen-containing epoxide or dihalohydrin, such as the reaction products of resorcinol, catechol, hydroquinone, methyl resorcinol or polynuclear phenols such as 2,2'-bis(4-hydroxyphenyl) propane (Bisphenol A), 2,2 - bis(4 - hydroxyphenyl) butane, 4,4-dihydroxybenzophenone and 1,5-dihydroxy naphthalene with halogen-containing epoxides such as 3-chloro-1,2-epoxybutane, 3-chloro-1,2-epoxyoctane, and epichlorhydrin.

Typical epoxy compounds that combine stabilizing with plasticizing action are indicated above under plasticizers.

A total of from 0.5 to 10 parts by weight of the stabilizers can be used for each 100 parts by weight of the resin. More stabilizer composition can be used, but usually no better result is obtained, and therefore such amounts are uneconomical and wasteful.

A small amount, usually not more than 1.5%, of a parting agent, also can be included. Typical parting agents are the higher aliphatic acids having from twelve to twenty-four carbon atoms, such as stearic acid, lauric acid, palmitic acid and myristic acid, mineral lubricating oils, polyvinyl stearate, polyethylene and paraffin wax.

The preparation of the stabilized composition is easily accomplished by conventional procedures. The selected stabilizer combination ordinarily is mixed with the plasticizer, and this then is blended with the polyvinyl chloride resin, using, for instance, plastic mixing rollers, at a temperature at which the mix is fluid and thorough blending facilitated, milling the plasticizer and stabilizer with the resin on a 2-roll mill at from 250 to 350° F. for a time sufficient to form a homogeneous sheet, five minutes, usually. After the mass is uniform, it is sheeted off in the usual way.

The organic phosphites of the invention also are effective stabilizers for olefin polymers such as polyethylene, polypropylene, polybutylene, and higher polyolefins.

Olefin polymers on heating and working in air undergo degradation, resulting in a loss in melt viscosity. This problem is particularly serious with polypropylene. The organic phosphites of the invention are effective in overcoming this reduction in melt viscosity, and in this respect represent an extension upon Patent No. 3,015,644.

The organic phosphites can be employed with any olefin polymer, including low-density polyethylene, high-density polyethylene, polyethylenes prepared by the Ziegler process, polypropylenes prepared by the Ziegler process, and by other polymerization methods from propylene, poly(butene-1), poly(pentene-1), poly(3-methylbutene-1), poly(4-methylpentene-1), polystyrene, and mixtures of polyethylene and polypropylene with other compatible polymers; such as mixtures of polyethylene and polypropylene, and copolymers of such olefins, such as copolymers of ethylene, propylene, and butene, with each other and with other copolymerizable monomers, which present the instability problem that is resolved by the phosphites of the invention. The term "olefin polymer" encompasses both homopolymers and copolymers.

The phosphite is incorporated with the olefin polymer alone or in conjunction with other olefin polymer stabilizers. A number of such stabilizers are disclosed in pending U.S. applications Ser. Nos. 762,681 filed Sept. 23, 1958, now abandoned, 765,721 filed Oct. 17, 1958, now U.S. Patent No. 3,149,093, issued Sept. 15, 1964, and 60,792 filed Oct. 6, 1960, now abandoned, and any of these can be employed as described herein. The phosphite can be added to an olefin polymer such as polypropylene or polyethylene which has not been degraded to a significant degree, and if it is added at this state, it is capable of holding the rate of reduction in melt viscosity to a very low level. If the stabilizer or stabilizer combination is added to the olefin polymer at a stage of partial degradation, it is capable of substantially preventing any further degradation; i.e. the subsequent reduction in melt viscosity after addition will be minimized.

A sufficient amount of the stabilizer is used to hold the change in melt viscosity with time at the hot-working temperature to the limit required for working with the equipment at hand. Very small amounts are usually adequate. Amounts within the range from about 0.005 to about 5% by weight of the olefin polymer are satisfactory. Preferably, from 0.1 to 1% is employed for optimum stabilization. There is no real upper limit on the amount of stabilizer but inasmuch as these compounds are expensive, it is usually desirable to use the minimum necessary to give the required stabilization.

After the polypropylene has been worked so that its melt viscosity has been reduced to the desired range, the stabilizer is incorporated in the polymer in suitable mixing equipment, such as a mill or a Banbury mixer. Working and blending is continued until the mixture is substantially uniform. The resulting composition is then removed from the mixing equipment, and reduced to the size and shape desired for marketing or use.

The following examples represent embodiments of polypropylene stabilized with phosphites in accordance with the invention:

Example III

A stabilized polypropylene composition was prepared using as the phosphite stabilizer the phosphite of Example I, together with a metal salt, zinc 2-ethyl hexoate, and a phenol, 4,4'-thiobis(2-tertiarybutyl-5-methyl phenol). The phosphite, phenol and metal salt were blended together to yield a stabilizer of the following composition:

Stabilizer composition: Parts by weight
   Zinc 2-ethylhexoate _____ 125
   Diphenyl mono(2,2,4-trimethyl pentanediol monoisobutyrate) phosphite _____ 300
   4,4'-thiobis(2-t-butyl-5-methyl phenol) _____ 150

The stabilzier blend was dispersed by hand-stirring in powdered, previously unstabilized polypropylene (Pro-Fax 6501, reduced specific viscosity (RSV) 3.0, melt index 0.4, ASTM D1238–57T at 190° C.) in an amount of 0.5% stabilizer by weight of the resin. The mixture was placed on a 2-roll mill and fluxed for five minutes at 170±2° C. Pieces cut from the milled sheet were used in the standard tests described below. The standard sample used in testing was 200 g., except for the Brabender plastograph, which was 35 g. The stabilizers were incorporated as described in the working example and milled to a sheet. Pieces cut from the milled sheet were then used in the test procedures.

Brabender plastograph (reduction in melt viscosity).— This instrument is essentially a heated sigmablade mixer in which the torque applied to the blades at 60 r.p.m. is continuously measured and plotted on a chart at kg.-cm. of torque. The bowl is maintained at 193° C. The charge is 35 g. polypropylene. Temperature of the plastic is 205–215° C., owing to frictional heat build-up.

Oven test, 205° C. (heat stability).—Small squares cut from a milled sheet are exposed in a forced-draft air oven lying flat on aluminum foil. Samples are removed at 15 minute intervals and examined for loss of shape, flow-out, or melting, which constitute failure. Color is noted at failure.

Compression molding, 190° C. (resistance to embrittlement and loss of plasticity).—Pieces cut from a milled sheet are compression-molded at 190° C. for five minutes to give 6 x 6 inch slabs 20 mils (about 0.5 mm.) or 75 mils thick. Plasticity and color are then noted.

Heat aging, 150° C. oven (heat stability of molded samples.—Molded samples made as above are heated flat on aluminum foil in an air circulating oven at 150° C. Samples are removed daily and examined for cracking or powdering, either of which constitutes failure. Color is noted at the end of two days, if the sample has not yet failed.

Weatherometer (resistance to light deterioration).—The molded samples were held in a weatherometer at 51° C. black panel temperature, and noted every 16⅔ hours for development of cracking, either of which constitutes failure. Color is noted at the end of fifty hours.

Compression molding at high temperature, 287° C. (550° F.) (resistance to embrittlement and loss of plasticity at high temperatures).—Moldings are made as above, held in the mold thirty minutes at 287° C. (550° F.), cooled and examined for color and plasticity. Unstabilized as well as over-stabilized formulations crack and discolor under these conditions.

BRABENDER PLASTOGRAPH, 193° C., 60 R.P.M.

Stabilizer system: (Kg.-cm. of torque)
   After 15 minutes working _____ 1300
   After 15 minutes working _____ 1260
   After 25 minutes working _____ 1160
   Color, 25 minutes _____ Light gray

OVEN TEST, 205° C.

Stabilizer system:
   Time to failure _____ 2 hours
   Initial color _____ Colorless
   Color at failure _____ Light gray COMPRESSION MOLDING, 6 x 6 INCH SLABS, 20 AND 75 MILS THICK Stabilizer system:
   Condition _____ Good
   Color _____ Colorless

HEAT AGING: MOLDED 20 MIL SPECIMENS, 150° C.

Stabilizer system:
   Days to failure _____ 6½
   Color, 2 days _____ Light gray

WEATHEROMETER EXPOSURE, 20 MIL SPECIMENS, 51° C. BLACK PANEL TEMPERATURE

Stabilizer system:
   Hours to failure _____ 120
   Color, 50 hours _____ Colorless

HIGH-TEMPERATURE COMPRESSION MOLDING, 287° C.

Stabilizer system:
   Condition _____ Good
   Color _____ Colorless

Example IV

Two stabilized polypropylene compositions were prepared, using the phosphite stabilizer of Example III together with a metal salt, and a phenol, which were blended to yield a stabilizer of the following composition:

Stabilizer composition: Parts by weight
   Zinc 2-ethylhexoate _____ 125
   Diphenyl mono(2,2,4 - trimethyl pentanediol monoisobutyrate) phospite _____ 250
   1,1,3 - tris (2-methyl,4 - hydroxy - 5- t-butyl phenyl) butone _____ 125

This composition was blended with polypropylene (Pro-Fax 6501) in the amount given in the table, and then tested by the standard heat-aging test in comparison with a similar composition containing the blend, with the addition of dilauryl thiodipropionate.

TABLE I

| Stabilizer System: | Stabilizer Composition | Dilauryl thiodipropionate | Heat Aging, Molded 20 Mil Specimens, 150° C. | |
|---|---|---|---|---|
| | | | Days to Failure | Color 2 days |
| A | 0 | 0 | 1 | Colorless. |
| B | 0.25 | 0 | 3 | Do. |
| C | 0.50 | 0 | 6 | Do. |
| D | 1.00 | 0 | 8 | Do. |
| E | 0 | 0.3 | 3 | Do. |
| F | 0 | 1 | 3 | Do. |
| G | 0.10 | 0.3 | 4 | Do. |
| H | 0.25 | 0.3 | 3 | Do. |
| I | 0.45 | 0.1 | 15 | Do. |
| J | 0.45 | 0.2 | 26 | Do. |
| K | 0.45 | 0.3 | 34 | Do. |
| L | 0.35 | 0.5 | 40 | Do. |
| M | 0.55 | 0.3 | 37 | Do. |
| N | 0.75 | 0.3 | 34 | Do. |

The very considerable improvement in resistance to aging at 150° C. due to the dilauryl thiodipropionate is evident from the data. Reduction in melt viscosity was small in 45 minutes, and heat stability, resistance to embrittlement and loss of plasticity at low and high temperatures, and resistance to light deterioration, are all rated as excellent.

Example V 346 grams of 2-ethylhexyl diphenyl phosphite and 360 grams of ethylene glycol monophenylacetate were reacted in accordance with the procedure of Example II. A total of 175 grams of phenol were recovered, indicating substantially complete formation of 2-ethylhexyl (ethylene glycol monophenylacetate) phosphite.

This phosphite was used to form a stabilizer composition having the following composition:

| Stabilizer composition: | Parts by weight |
| --- | --- |
| 4,4' - n - butylidene - bis (2-tertiary-butyl-5-methylphenol) | 100 |
| 2-ethylhexyl (ethylene glycol monophenylacetate) phosphite | 275 |
| Zinc 2-ethylhexoate | 125 |

This composition was blended with polypropylene (Pro-Fax 6501) in an amount of 0.6%, and then tested by the standard heat-aging test in comparison with a similar composition containing the blend in an amount of 0.6%, with the addition of 0.3% dilauryl thiodipropionate. The composition without the dilauryl thiodipropionate was stable for six days, and the composition with the thiodipropionate, for 24 days. Both compositions were colorless at the end of two days.

Reduction in viscosity was small in 45 minutes and heat stability, resistance to embrittlement and loss of plasticity at low and high temperature, and resistance to light deterioration, are all rated as excellent.

We claim:

1. A polyvinyl chloride resin composition having an improved resistance to deterioration when heated at 350° F., comprising a polyvinyl chloride resin and an organic triphosphite having the formula:

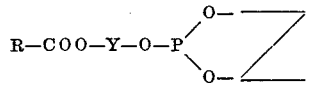

wherein RCOO is an aliphatic organic acid radical having from two to twenty-four carbon atoms, Y is an alkylene radical having from two to twenty carbon atoms, and Z is selected from the group consisting of hydrogen and organic radicals including RCOOY taken in sufficient number to satisfy the valences of the two phosphite oxygen atoms.

2. A polyvinyl chloride resin composition in accordance with claim 1, in which Z contains at least one aryl group.

3. A polyvinyl chloride resin composition in accordance with claim 1, in which Z contains at least one alkaryl radical.

4. A polyvinyl chloride resin composition in accordance with claim 1, in which Z contains at least one aralkyl radical.

5. A polyvinyl resin composition in accordance with claim 1 in which the polyvinyl chloride resin is polyvinyl chloride homopolymer.

6. A polyvinyl chloride resin composition in accordance with claim 1 in which the polyvinyl chloride resin is a copolymer of vinyl chloride and vinyl acetate.

7. A polyvinyl chloride resin composition in accordance with claim 1 including an epoxy compound having from eight to one hundred fifty carbon atoms.

8. A polyvinyl chloride resin composition in accordance with claim 1 including a salt of a polyvalent metal and an organic acid having from six to twenty carbon atoms.

9. A polyvinyl chloride resin composition in accordance with claim 1 in which the aliphatic monocarboxylic acid ester group is a 2,2,4-trimethyl-pentanediolmonoisobutyrate group.

10. A polyvinyl chloride resin composition in accordance with claim 9, in which the organic triphosphite is diphenyl mono(2,2,4 - trimethyl-pentanediol-monoisobutyrate) phosphite.

References Cited

UNITED STATES PATENTS 3,153,080   10/1964   Caldwell _____ 260—952

DONALD E. CZAJA, *Primary Examiner.*

R. W. GRIFFIN, *Assistant Examiner.*

UNITED STATES PATENT OFFICE
CERTIFICATE OF CORRECTION

Patent No. 3,396,130                                        August 6, 1968

William E. Leistner et al.

It is certified that error appears in the above identified patent and that said Letters Patent are hereby corrected as shown below:

In the heading to the printed specification, in the title of the invention, line 2, "TRIPHOSPHITES" should read -- PHOSPHITES --. Column 2, line 43, "abiethyl" should read -- abietyl --. Column 6, line 11, "or", first occurrence, should read -- of --. Column 7, line 55, "4,4-dihydroxybenzo-" should read -- 4,4´-dihydroxybenzo- --. Column 12, after line 40, insert the following references:

2,841,608    7/1958    Hechenbleikner ------- 260-45.7
     2,934,554    4/1960    Lane ----------------- 260-461.315
     2,997,454    8/1961    Leistner et al. ------ 260-45.85

Signed and sealed this 27th day of January 1970.

(SEAL)
Attest:

EDWARD M. FLETCHER, JR.                        WILLIAM E. SCHUYLER, JR
Attesting Officer                                  Commissioner of Patents